(12) United States Patent
Chen et al.

(10) Patent No.: US 12,489,506 B2
(45) Date of Patent: Dec. 2, 2025

(54) METHOD, APPARATUS, AND DEVICE FOR SELECTING PARAMETERS OF CHANNEL STATE INFORMATION, AND STORAGE MEDIUM

(71) Applicant: PENG CHENG LABORATORY, Shenzhen (CN)

(72) Inventors: Jiacheng Chen, Shenzhen (CN); Jingbo Liu, Shenzhen (CN); Haibo Zhou, Shenzhen (CN)

(73) Assignee: PENG CHENG LABORATORY, Shenzhen (CN)

( * ) Notice: Subject to any disclaimer, the term of this patent is extended or adjusted under 35 U.S.C. 154(b) by 0 days.

(21) Appl. No.: 19/241,282

(22) Filed: Jun. 17, 2025

(65) Prior Publication Data

US 2025/0317184 A1    Oct. 9, 2025

Related U.S. Application Data

(63) Continuation of application No. PCT/CN2024/123983, filed on Oct. 10, 2024.

(30) Foreign Application Priority Data

Jan. 10, 2024    (CN) .................... 202410042195.X (51) Int. Cl.
H04B 7/06        (2006.01)

(52) U.S. Cl.
CPC ......... H04B 7/0639 (2013.01); H04B 7/0632 (2013.01)

(58) Field of Classification Search
CPC ................ H04B 7/0639; H04B 7/0632
See application file for complete search history.

(56) References Cited

U.S. PATENT DOCUMENTS 8,259,842 B2 * 9/2012 Khojastepour ...... H04B 7/0456
375/295

FOREIGN PATENT DOCUMENTS

| CN | 114124180 A | 3/2022 |
| CN | 115776318 A | 3/2023 |

(Continued)

OTHER PUBLICATIONS

International Search Report and Written Opinion issued in corresponding PCT Application No. PCT/CN2024/123983, dated Nov. 18, 2024.

*Primary Examiner* — Ayanah S George
(74) *Attorney, Agent, or Firm* — Westbridge IP LLC (57) ABSTRACT

Disclosed are a method, an apparatus and a device for selecting parameters of channel state information, and a storage medium. The method includes: acquiring sampling data at a target location point at different times, the target location point is a location point of a parameter to be selected, and the location point that needs to be sampled among geographical location points within a base station coverage area; determining a target data stream number of the target location point based on the sampling data; determining a target precoding matrix of the target location point based on the target data stream number and a preset neural network model; and determining a channel quality indicator of the target location point based on the target precoding matrix, the data stream number, the precoding matrix, and the channel quality indicator are parameters of channel state information.

6 Claims, 4 Drawing Sheets

---

S3a1 in response to the target location point being a known location point, determining an optimal precoding matrix set corresponding to the target data stream number S3a2 encoding and reconstructing the optimal precoding matrix set based on the VAE to obtain the target precoding matrix of the target location point, where the VAE is obtained by training a first neural network model to be trained using the optimal precoding matrix set corresponding to each data stream number as input and the precoding matrix of the position point corresponding to each data stream number as output (56) References Cited

FOREIGN PATENT DOCUMENTS

| | | |
|---|---|---|
| CN | 115776319 A | 3/2023 |
| CN | 116112044 A | 5/2023 |
| CN | 117833971 A | 4/2024 |
| WO | 2023274926 A1 | 1/2023 |

\* cited by examiner

METHOD, APPARATUS, AND DEVICE FOR SELECTING PARAMETERS OF CHANNEL STATE INFORMATION, AND STORAGE MEDIUM

CROSS-REFERENCE TO RELATED APPLICATIONS

This application is a continuation application of International Application No. PCT/CN2024/123983, filed on Oct. 10, 2024, which claims priority to Chinese Patent Application No. 202410042195.X, filed on Jan. 10, 2024. All of the aforementioned applications are incorporated herein by reference in their entireties.

TECHNICAL FIELD

The present application relates to the technical field of wireless communication, and in particular to a method, an apparatus, and a device for selecting parameters of channel state information, and a storage medium.

BACKGROUND

In order to improve the quality of signals, Multiple-Input Multiple-Output (MIMO) wireless communication technology is currently used to achieve signal transmission between a transmitter and a receiver.

Common MIMO requires the use of multiple antennas at the transmitter and the receiver to send and receive signals. In order for MIMO to achieve high-speed downlink transmission, the base station needs to send a pilot sequence to the user. The user estimates the transmission channel through the pilot sequence and calculates the channel state information based on the channel. The channel state information is then fed back to the base station to guide the MIMO transmission. However, as the quantity of antennas increases, the pilot and channel state feedback information will also increase, resulting in a decrease in the actual effective data transmission rate.

SUMMARY

The main objective of the present application is to provide a method, an apparatus, and a device for selecting parameters of channel state information, and a storage medium, aiming to solve the technical problem in the related art that as the quantity of antennas increases, the pilot and channel state feedback information will also increase, resulting in a decrease in the actual effective data transmission rate.

In order to achieve the above objective, the present application provides a method for selecting parameters of channel state information, including the following steps:
  acquiring sampling data at a target location point at different times, the target location point is a location point of a parameter to be selected, and the location point that needs to be sampled among geographical location points within a base station coverage area;
  determining a target data stream number of the target location point based on the sampling data;
  determining a target precoding matrix of the target location point based on the target data stream number and a preset neural network model; and
  determining a channel quality indicator of the target location point based on the target precoding matrix, the data stream number, the precoding matrix, and the channel quality indicator are parameters of channel state information.

In an embodiment, the preset neural network model includes a variational autoencoder (VAE), and the determining the target precoding matrix of the target location point based on the target data stream number and the preset neural network model includes:
  in response to the target location point being a known location point, determining an optimal precoding matrix set corresponding to the target data stream number; and
  encoding and reconstructing the optimal precoding matrix set based on the VAE to obtain the target precoding matrix of the target location point, the VAE is obtained by training a first neural network model to be trained using the optimal precoding matrix set corresponding to each data stream number as input and the precoding matrix of the position point corresponding to each data stream number as output.

In an embodiment, the VAE includes an encoder and a decoder, and the encoding and reconstructing the optimal precoding matrix set based on the VAE to obtain the target precoding matrix of the target location point includes:
  performing dimensional transformation on each optimal precoding matrix in the optimal precoding matrix set based on the encoder to obtain a corresponding Gaussian variable;
  performing average operations on means and variances of all the Gaussian variables based on the VAE to determine an average mean and an average variance;
  querying a target Gaussian variable with a smallest difference from the average mean and the average variance among the Gaussian variables; and
  reconstructing the precoding matrix based on the decoder and the mean and variance of the target Gaussian variable to obtain the target precoding matrix of the target location point.

In an embodiment, the determining the channel quality indicator of the target location point based on the target precoding matrix includes:
  determining a target signal-to-interference-plus-noise ratio (SINR) of each data stream number based on the target precoding matrix;
  performing an average operation on the target SINRs to obtain an equivalent SINR value; and
  searching a channel quality indicator corresponding to the equivalent SINR value based on a preset mapping table.

In an embodiment, the determining the target data stream number of the target location point based on the sampling data includes:
  in response to the target location point being a known location point, determining mutual information of a channel on each subcarrier of the target location point based on the sampling data;
  performing a summation operation on the mutual information of each subcarrier to obtain a total mutual information;
  determining data stream numbers at different times based on a maximum value of the total mutual information to obtain a data stream number set of the target location point;
  determining a mode of the data stream number set and whether the mode satisfies a preset proportion;

in response to the mode satisfying the preset proportion, determining the mode as the target data stream number of the target location point; or in response to the mode not satisfying the preset proportion, determining a value equal to the mode minus one as the target data stream number of the target location point.

In an embodiment, the preset neural network model includes a Gaussian Process Regression (GPR) model, and the determining a target precoding matrix of the target location point based on the target data stream number and a preset neural network model further includes:

in response to the target location point being an unknown location point, querying a target known location point closest to the target location point;

determining a reference data stream number of the target known location point;

selecting a target GPR model corresponding to the reference data stream number, the GPR model is obtained by training a second neural network model to be trained using sample location points as inputs and means and variances of Gaussian variables corresponding to precoding matrices of the sample location points as outputs;

generating a reference mean and a reference variance of a Gaussian variable of the precoding matrix corresponding to the target known location point based on the target GPR model; and reconstructing the target precoding matrix based on the encoder in the VAE and the reference mean and reference variance to obtain the target precoding matrix of the target location point.

In an embodiment, the determining the target data stream number of the target location point based on the sampling data further includes:

in response to the target location point being an unknown location point, determining the reference data stream number as the target data stream number of the target location point.

In addition, to achieve the above purpose, the present application further provides an apparatus for selecting parameters of channel state information, including:

an acquisition module configured to acquire sampling data at a target location point at different times, the target location point is a location point of a parameter to be selected, and the location point that needs to be sampled among geographical location points within a base station coverage area;

a stream number determination module configured to determine a target data stream number of the target location point based on the sampling data;

a matrix determination module configured to determine a target precoding matrix of the target location point based on the target data stream number and a preset neural network model; and a quality determination module configured to determine a channel quality indicator of the target location point based on the target precoding matrix, the data stream number, the precoding matrix, and the channel quality indicator are parameters of channel state information.

In addition, to achieve the above-mentioned purpose, the present application further provides a device for selecting parameters of channel state information, which includes: a memory, a processor, and a program for selecting parameters of channel state information stored in the memory and executable on the processor, the program for selecting parameters of channel state information is configured to implement the method for selecting parameters of channel state information as described above.

In addition, to achieve the above-mentioned purpose, the present application further provides a storage medium, on which a program for selecting parameters of channel state information is stored. When the program for selecting parameters of channel state information is executed by a processor, the method for selecting parameters of channel state information described above are implemented.

The present application provides a method, an apparatus, a device for selecting parameters of channel state information, and a storage medium. Compared with the related art in which the pilot and channel state feedback information will also increase with the increase of the quantity of antennas, resulting in a decrease in the actual effective data transmission rate. In the present application, sampling data at the target location point at different times is obtained, the target location point is the location point of the parameter to be selected, and the target location point is the location point that needs to be sampled among the geographical locations within the coverage area of the base station. The target data stream number of the target location point is determined based on the sampling data; the target precoding matrix of the target location point is determined based on the target data stream number and the preset neural network model; the channel quality indicator of the target location point is determined based on the target precoding matrix, the data stream numbers, the precoding matrix and the channel quality indicator are all parameters of the channel state information. That is, in the present application, the target data stream number of the target location point is determined by sampling data at different times, and then the precoding matrix and channel quality indicator of any target location point are inferred according to the target data stream number and the preset neural network model, thereby avoiding the feedback process, and avoiding the increase of channel state feedback information when the quantity of antennas increases, thereby improving the actual effective data transmission rate.

BRIEF DESCRIPTION OF THE DRAWINGS

The accompanying drawings, which are incorporated in and constitute a part of this specification, illustrate embodiments consistent with the present application and, together with the description, serve to explain the principles of the present application.

In order to more clearly illustrate the embodiments of the present application or the technical solutions in the related art, the drawings required for use in the embodiments or the description of the prior art will be briefly introduced below. Obviously, for those skilled in the art, other drawings can be obtained based on these drawings without paying any creative work.

The realization of the purpose, functional features and advantages of the present application will be further described with reference to the embodiments and the accompanying drawings.

DETAILED DESCRIPTION OF THE EMBODIMENTS

It should be understood that the specific embodiments described herein are only used to explain the present application and are not used to limit the present application.

Figure 1:
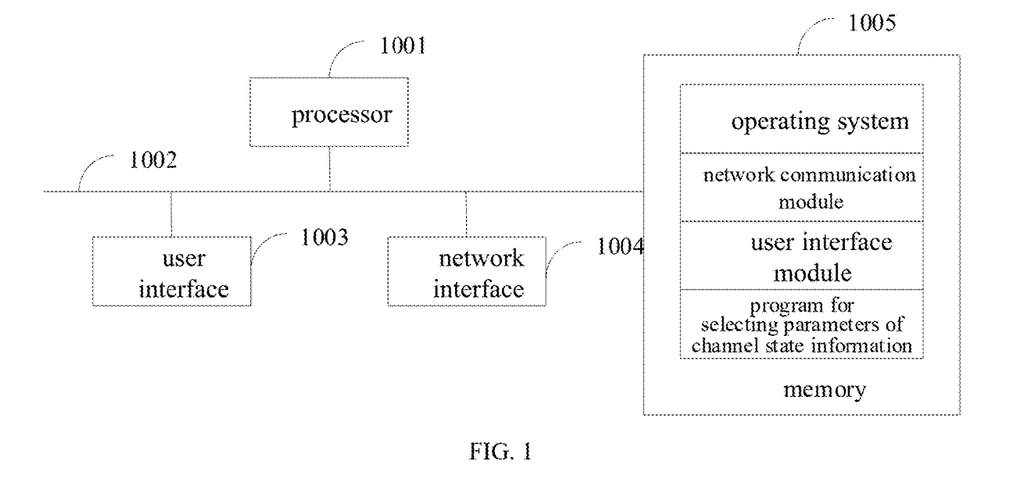
FIG. 1 is a schematic diagram of a device mechanism for selecting parameters of channel state information in a hardware operating environment according to an embodiment of the present application.

FIG. 1 is a schematic diagram of the structure of a device for selecting parameters of channel state information in a hardware operating environment according to an embodiment of the present application.

As shown in FIG. 1, the device for selecting parameters of channel state information may include: a processor 1001, such as a central processing unit (CPU), a communication bus 1002, a user interface 1003, a network interface 1004, and a memory 1005. The communication bus 1002 is used to realize the connection and communication between these components. The user interface 1003 may include a display, an input unit such as a keyboard, and the user interface 1003 may also include a standard wired interface and a wireless interface. The network interface 1004 may include a standard wired interface and a wireless interface (such as a wireless fidelity (Wi-Fi) interface). The memory 1005 may be a high-speed random access memory (RAM), or a stable non-volatile memory (NVM), such as a disk storage. The memory 1005 may also be a storage device independent of the aforementioned processor 1001.

Those skilled in the art will appreciate that the structure shown in FIG. 1 does not constitute a limitation on the device for selecting parameters of channel state information, and may include more or fewer components than shown in the figure, or a combination of certain components, or a different arrangement of components.

As shown in FIG. 1, the memory 1005 as a storage medium may include an operating system, a network communication module, a user interface module, and a program for selecting parameters of channel state information.

In the device for selecting parameters of channel state information shown in FIG. 1, the network interface 1004 is mainly used for data communication with the network server. The user interface 1003 is mainly used for data interaction with the user. The processor 1001 and the memory 1005 in the device for selecting parameters of channel state information of the present application can be set in the device for selecting parameters of channel state information, and the device for selecting parameters of channel state information calls the program for selecting parameters of channel state information stored in the memory 1005 through the processor 1001, and executes the method for selecting parameters of channel state information provided in the embodiment of the present application.

Figure 2:
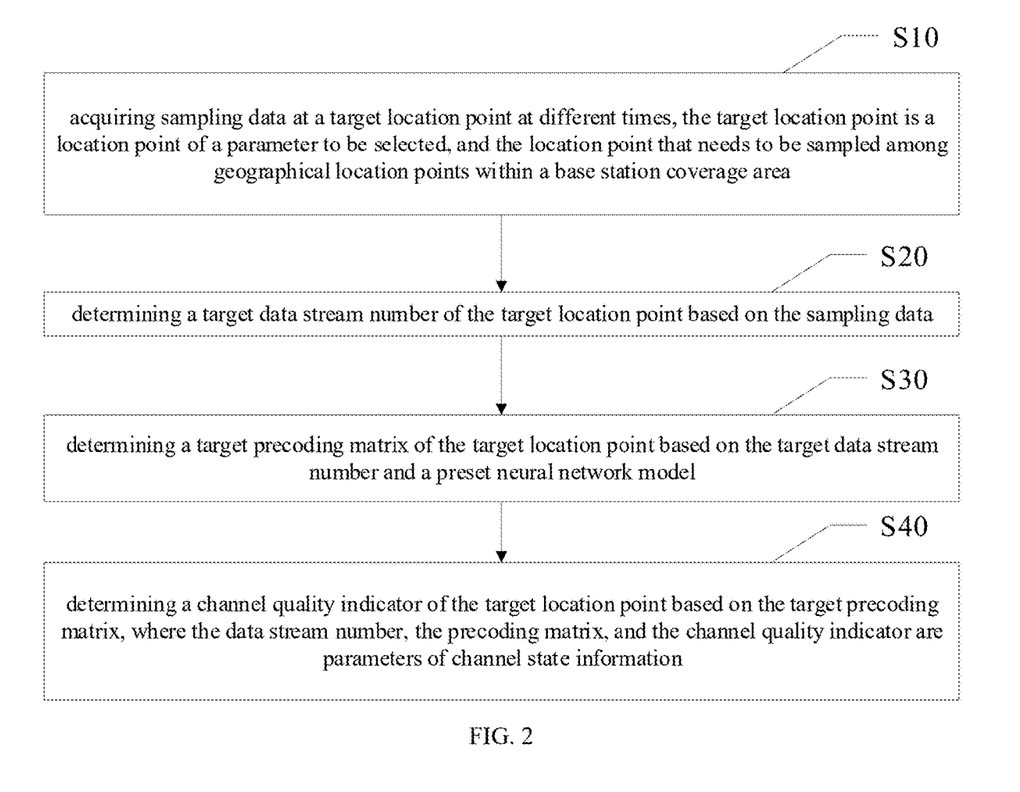
FIG. 2 is a flowchart of a method for selecting parameters of channel state information according to an embodiment of the present application.

Embodiments of the present application provide a method for selecting parameters of channel state information. As shown in FIG. 2, FIG. 2 is flowchart of the method for selecting parameters of channel state information according to an embodiment of the present application.

It should be noted that the executor of this embodiment may be a device for selecting parameters of channel state information, and the device for selecting parameters of channel state information may be an electronic device such as a personal computer, a smart phone, a tablet computer, or other devices that can achieve the same or similar functions, which is not limited in the embodiments. In this embodiment and the following embodiments, the method for selecting parameters for the channel state information of the present application is described by taking the device for selecting parameters of channel state information as an example.

In this embodiment, the method for selecting parameters of the channel state information includes:

step S10, acquiring sampling data at a target location point at different times, the target location point is a location point of a parameter to be selected, and the location point that needs to be sampled among geographical location points within a base station coverage area.

The location point can be understood as a geographical location point within the coverage area of the base station. The location point can be a known location point or an unknown location point. A known location point can be understood as a location point where communication transmission data has been measured, and an unknown location point can be understood as a location point where communication transmission data has not been measured. The target location point can be a location point where parameters need to be configured, and the location point can be any location point on the transmission channel.

The sampling may be understood as sampling of the channel matrix of the location point in the time domain and on different subcarriers.

In an embodiment, the target location point where the parameters need to be configured is first determined, and then the channel matrix of the target location point is subjected to Singular Value Decomposition (SVD) at different times to obtain the precoding matrix of the stream numbers of the right unitary matrix, so as to obtain the equivalent channel data of the target location point, the noise power during communication, and the zero-forcing equalizer at the receiver according to the precoding matrix, so as to determine the data stream numbers of the target location point according to these data. The collection time can be customized by the user according to the needs, or can be determined based on historical experience, and there is no specific limitation. The channel matrix is a matrix on different subcarriers, and the dimension is the number of transmitting and receiving antennas.

Step S20, determining a target data stream number of the target location point based on the sampling data.

The target data stream number can be understood as the data stream numbers passing through the target location point at a certain moment.

It should be noted that the sampling data can be used to first determine the ratio of the signal to the interference plus noise that can be reached by each data stream at the target location point, and then the ratio can be used to determine the mutual information that can be reached by each subcarrier passing through the target location point. Since the mutual information can be understood as the difference between the probability of a signal sent by the transmitter and the probability of a signal received by the receiver, it can accurately reflect the strength of the correlation between the transmitter and the receiver. Therefore, determining the target data stream numbers at the target location point through the mutual information can ensure the accuracy of determining the target data stream numbers.

In an embodiment, the ratio of the signal to interference plus noise that can be reached for each data stream can be determined based on the data of the zero-forcing equalizer in the sampling data, the data stream numbers, and the noise power during communication, and then the mutual information that can be reached for each subcarrier at the target location point can be determined based on the ratio, and the target stream numbers at the target location point can be determined based on the mutual information. The mutual information that can be reached may be understood as the maximum mutual information that can be reached; the signal that can be reached may be understood as the maximum signal that can be passed through the channel at the target location point at the sampling time.

Step S30, determining a target precoding matrix of the target location point based on the target data stream number and a preset neural network model.

The preset neural network model is obtained by iteratively training the model to be trained, taking the optimal precoding matrix of each data stream as input and the precoding matrix of the target location point as output.

It should be noted that by presetting the neural network model to infer the target precoding matrix in the parameters of the channel state information of any location point, the channel feedback process is avoided, and then the calculation process of the feedback data is avoided, thereby improving the rate of determining the target precoding matrix of the target location point.

It should be noted that, since the neural network model is iteratively updated in real time, determining the target precoding matrix by presetting the neural network model can improve the accuracy of obtaining the target precoding matrix.

The preset neural networks may be one or multiple composite neural networks.

In an embodiment, the preset neural network may include Variational Auto-Encoder (VAE) and Gaussian Process Regression (GPR). If the target location point is a known location point, the optimal precoding matrix set corresponding to the stream numbers of the target location point can be determined according to the target data stream number, and the optimal precoding matrix set is input into the VAE, so that the optimal precoding matrix set is converted into a low-dimensional Gaussian variable through the VAE, and the precoding matrix is reconstructed through the Gaussian variable to obtain the target coding matrix of the target location point; if the target location point is an unknown location point, the neighboring point interpolation method can be used to reconstruct the precoding matrix using the target precoding matrix corresponding data of the nearest known location point, GPR and VAE to obtain the target precoding matrix of the unknown location point.

In an embodiment, since the target precoding matrix is obtained based on the optimal precoding matrix of each data stream, and the Gaussian variable corresponding to the target precoding matrix is a set of Gaussian variables corresponding to the optimal precoding matrix set, but since new parameters may be added during the precoding matrix reconstruction process, the target precoding matrix may not be identical to any optimal precoding matrix in the optimal precoding matrix set.

Step S40, determining a channel quality indicator of the target location point based on the target precoding matrix, where the data stream number, the precoding matrix, and the channel quality indicator are parameters of channel state information.

It should be noted that the channel quality indicator is a system that is established and managed for continuous improvement in the supply chain, emphasizing defect prevention and the process of reducing variation and waste. Since the target precoding matrix is not any of the known optimal precoding matrices, when using the target precoding matrix to determine the channel quality indicator, it is necessary to re-determine the ratio of the signal to interference plus noise that can be reached by each data stream to accurately obtain the channel quality indicator of the target location point. And when obtaining the channel quality indicator, there is no need to use the feedback signal from the receiver.

In an embodiment, if the target location point is a known location point, the ratio of the signal to interference plus noise reachable by the target precoding matrix corresponding to the data stream can be recalculated, and then the channel quality indicator of the target location point can be determined from a preset mapping table based on the ratio.

It should be noted that since the data stream numbers, precoding matrix and channel quality indicator are all parameters of the channel state information, and no feedback information from the receiver is required when determining these parameters, VAE and other methods are used to select parameters representing Channel State Information (CSI) at known locations, and VAE and GPR and other methods are used to infer the CSI parameters of any location point, thereby improving the actual effective data transmission rate.

This embodiment provides a method for selecting parameters for channel state information. Compared with the related art in which the pilot and channel state feedback information will also increase with the increase in the quantity of antennas, resulting in a decrease in the actual effective data transmission rate, in the present application, sampling data at the target location point at different times is obtained, the target location point is the location point of the parameter to be selected, and the target location point is the location point that needs to be sampled among the geographical locations within the coverage area of the base station. The target data stream number of the target location point is determined based on the sampling data; the target precoding matrix of the target location point is determined based on the target data stream number and the preset neural network model. The channel quality indicator of the target location point is determined based on the target precoding matrix, where the data stream numbers, the precoding matrix and the channel quality indicator are all parameters of the channel state information. That is, in the present application, the target data stream number of the target location point is determined by sampling data at different times, and then the precoding matrix and channel quality indicator of any target location point are inferred based on the target data stream number and the preset neural network model, thereby avoiding the feedback process, and avoiding the increase of channel state feedback information when the quantity of antennas increases, thereby improving the actual effective data transmission rate.

Figure 3:
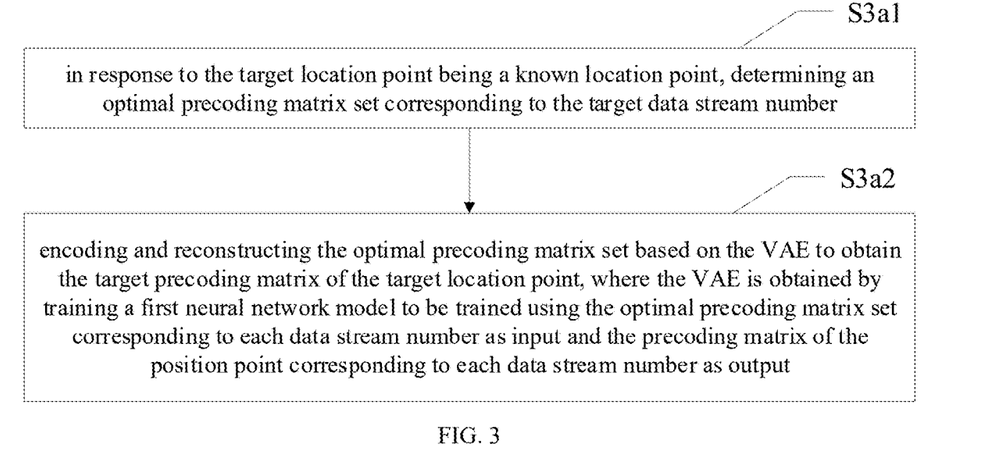
FIG. 3 is a flowchart of the method for selecting parameters of channel state information according to an embodiment of the present application.

As shown in FIG. 3, which is a flowchart of the method for selecting parameters of channel state information according to an embodiment of the present application.

Based on the above embodiment, in this embodiment, when the target location point is a known location point, the preset neural network model includes VAE, and the step of determining the target precoding matrix of the target location point based on the target data stream number and the preset neural network model includes:

Step S3a1, in response to the target location point being a known location point, determining an optimal precoding matrix set corresponding to the target data stream number;

Step S3a2, encoding and reconstructing the optimal precoding matrix set based on the VAE to obtain the target precoding matrix of the target location point, where the VAE is obtained by training a first neural network model to be trained using the optimal precoding matrix set corresponding to each data stream number as input and the precoding matrix of the position point corresponding to each data stream number as output.

The optimal precoding matrix is the precoding matrix used when the sum of the mutual information amount reachable on each subcarrier at the target location point is maximum, and each data stream numbers corresponds to an optimal precoding matrix.

It should be noted that, since VAE takes the optimal precoding matrix set of the data stream numbers as input and the precoding matrices of the location points corresponding to the data stream numbers as output to train the model to be trained, and the model to be trained is a neural network model, the use of VAE can increase the accuracy and efficiency of determining the target precoding matrix at the target location point and reduce the amount of calculation, thereby shortening the time required for the target location point to select the target precoding matrix during data transmission, and speeding up the transmission of effective data.

Figure 4:
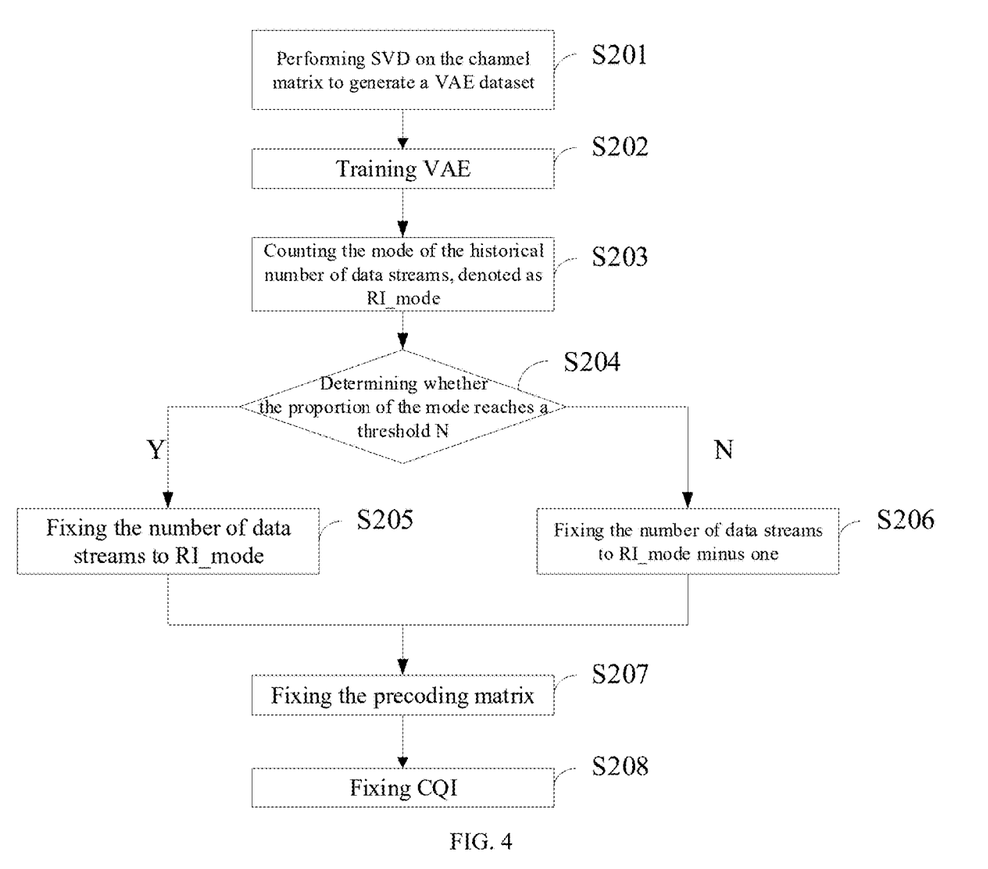
FIG. 4 is a schematic flowchart of a specific implementation of selecting parameters for known location points in the method for selecting parameters of channel state information of the present application.

It should be noted that VAE needs to be created before step S3a2;

In an embodiment, as shown in FIG. 4, step S201: historical channel data is a data set that is sampled and saved in the time domain for the channel matrix of a finite location point. For a known location point, at a certain time domain sampling point, SVD decomposition is first performed on the channel H on each subcarrier: H=U*S*V, the first N_s columns of the right unitary matrix V are the precoding matrix with N_s streams, where U is the left matrix and S is the diagonal matrix. The H matrix is decomposed into the U matrix, the S matrix, and the V matrix. N_s is taken from the beginning, and the maximum value of the data stream numbers is the smaller of the quantity of transmitting antennas and the quantity of receiving antennas. Then, N_s is fixed from one to the maximum, the first N_s columns of the V matrix are used as the precoding matrix W, and the signal to interference plus noise ratio (SINR) that can be reached for each data stream can be calculated:

$$SINR_l = \frac{|G(l,l)|_F}{\sum_{i=1, i \neq l}^{N_s} |G(l,i)|_F + \sigma_n^2 \sum_{i=1}^{N_s} |E_k(l,i)|_F}$$

E is the zero-forcing equalizer at the receiver, G is the equivalent channel, F represents the power, and $\sigma_n^2$ is the noise power. The numerator represents the useful signal power, the first term of the denominator is the interference power between the data streams, and the second term is the enhanced noise power. Next, the mutual information that can be achieved on each subcarrier is calculated, and the precoding matrix used when the sum of the mutual information is the greatest is found. The precoding matrix is the optimal precoding matrix for the time domain sampling point with the stream numbers being N_s. Each location point has a different time domain sampling channel. Through this processing, the optimal precoding matrix set with the stream numbers from one to the maximum can be obtained. The calculation formula for the mutual information is I=$\log_2$ (1+SINR). Step S202, training the VAE with the stream numbers from one to the maximum. For different numbers of data transmission streams, the optimal precoding matrix after SVD decomposition of the corresponding stream numbers is used as the input of the VAE. The encoder reduces the dimension of this input into a low-dimensional Gaussian variable, and the decoder reconstructs the original input. During the training process, the learning rate is set to $10^{-3}$, and a total of 100 rounds of training are performed, with 128 input and output samples extracted in each round. The ADAM algorithm is used to update the gradient of the VAE neural network parameters.

In an embodiment, the VAE includes an encoder and a decoder, and the step of encoding and reconstructing the optimal precoding matrix set based on the VAE to obtain the target precoding matrix of the target location point includes:

step S3a21, performing dimensional transformation on each optimal precoding matrix in the optimal precoding matrix set based on the encoder to obtain a corresponding Gaussian variable;

step S3a22, performing average operations on means and variances of all the Gaussian variables based on the VAE to determine an average mean and an average variance;

step S3a23, querying a target Gaussian variable with a smallest difference from the average mean and the average variance among the Gaussian variables; and step S3a24, reconstructing the precoding matrix based on the decoder and the mean and variance of the target Gaussian variable to obtain the target precoding matrix of the target location point.

It should be noted that by converting the optimal preset coding matrix into a Gaussian variable, the noise interference to the quantized signal during channel propagation can be simulated through the Gaussian variable, so as to deeply understand and analyze the transmission characteristics of the message in a noisy and interfered channel, and average the mean and variance of the Gaussian variable, and use the average mean and average variance to accurately determine the central variable of the Gaussian variable, so as to determine the target precoding matrix that best represents the target location point through the central variable.

In an embodiment, as shown in FIG. 4, step S207: according to the determined data stream numbers RI_fixed, the optimal precoding matrix set corresponding to the stream numbers at the location point is input into the VAE of the corresponding stream numbers. Then, the encoder will output low-dimensional latent space Gaussian variables, which are characterized by their respective means and variances. Next, the means and variances of all Gaussian variables are averaged, and the two values are used as standards to measure the gap between each Gaussian variable and the statistical average. Finally, the Gaussian variable with the smallest gap is selected as the representative variable, and its mean and variance are input into the decoder to obtain the reconstructed precoding matrix, which is the representative precoding matrix.

Further, the step of determining the channel quality indicator of the target location point based on the target precoding matrix includes:

step S4a1, determining a target SINR of each data stream number based on the target precoding matrix;

step S4a2, performing an average operation on the target SINRs to obtain an equivalent SINR value; and step S4a3, searching a channel quality indicator corresponding to the equivalent SINR value based on a preset mapping table.

The preset mapping table may represent the mapping relationship between the SINR value and the channel quality indicator.

It should be noted that since new parameters may be introduced in the process of reconstructing the precoding matrix, the target precoding matrix finally obtained is different from the optimal precoding matrix in the optimal precoding matrix set, and the channel index needs to be obtained by using a preset mapping table to search according to the SINR value corresponding to the target precoding matrix. Therefore, in order to ensure the accuracy of the determined channel quality index, it is necessary to recalculate the SINR value according to the target precoding matrix, determine the target SINR value of each data stream number, and average the target SINR values of all data stream numbers to obtain an equivalent SINR value that can characterize all data stream numbers.

In an embodiment, as shown in FIG. 4, step S208: for the channel matrix sampled in a certain time domain at the location point, the precoding matrix fixed in step S207 is used to calculate the SINR achievable on each subcarrier and each data stream. Then, all SINR values are averaged to obtain an equivalent SINR value. Through the preset mapping table between SINR and CQI, the equivalent SINR is mapped to the CQI value. In this way, the historical CQI data of the location point in the time domain can be obtained. Finally, the historical CQI data is averaged and rounded down. This integer value is the representative value of the CQI at this location point.

Further, the step of determining the target data stream number of the target location point based on the sampling data includes:

step S2a1, in response to the target location point being a known location point, determining mutual information of a channel on each subcarrier of the target location point based on the sampling data;

step S2a2, performing a summation operation on the mutual information of each subcarrier to obtain a total mutual information;

step S2a3, determining data stream numbers at different times based on a maximum value of the total mutual information to obtain a data stream number set of the target location point;

step S2a4, determining a mode of the data stream number set and whether the mode satisfies a preset proportion;

step S2a5, in response to the mode satisfying the preset proportion, determining the mode as the target data stream number of the target location point; or step S2a6, in response to the mode not satisfying the preset proportion, determining a value equal to the mode minus one as the target data stream number of the target location point.

It should be noted that since the mode is the number that appears most frequently in a set, the mode can accurately represent the set. Therefore, the mode of the data stream number set of the target location point at different times is used as the target data stream number of the target location point, that is, the data stream number with the most repetitions is selected from the data stream number set at different times as the target data stream number.

In an embodiment, as shown in FIG. 4, step S203: for a channel sampled in a certain time domain at a certain location point, the mutual information of the channel on each subcarrier when using the optimal precoding matrix with the stream numbers from one to the maximum is calculated. Then, the mutual information and the stream numbers used when the maximum is used as the data stream numbers used at the sampling moment is selected. In this way, the historical data stream numbers at this location point in the time domain can be obtained. Finally, the mode appearing in the historical data stream number is counted and recorded as RI_mode. Step S204, for this location point, determining whether the proportion of RI_mode in the historical data stream number reaches N, if yes, executing step S205, if not, executing step S206. Step S205, fixing the data stream numbers used at this location point RI_fixed to RI_mode, and entering step S207. Step S206, fixing the data stream numbers used at this location point RI_fixed to RI_mode−1, and entering step S207.

Figure 5:
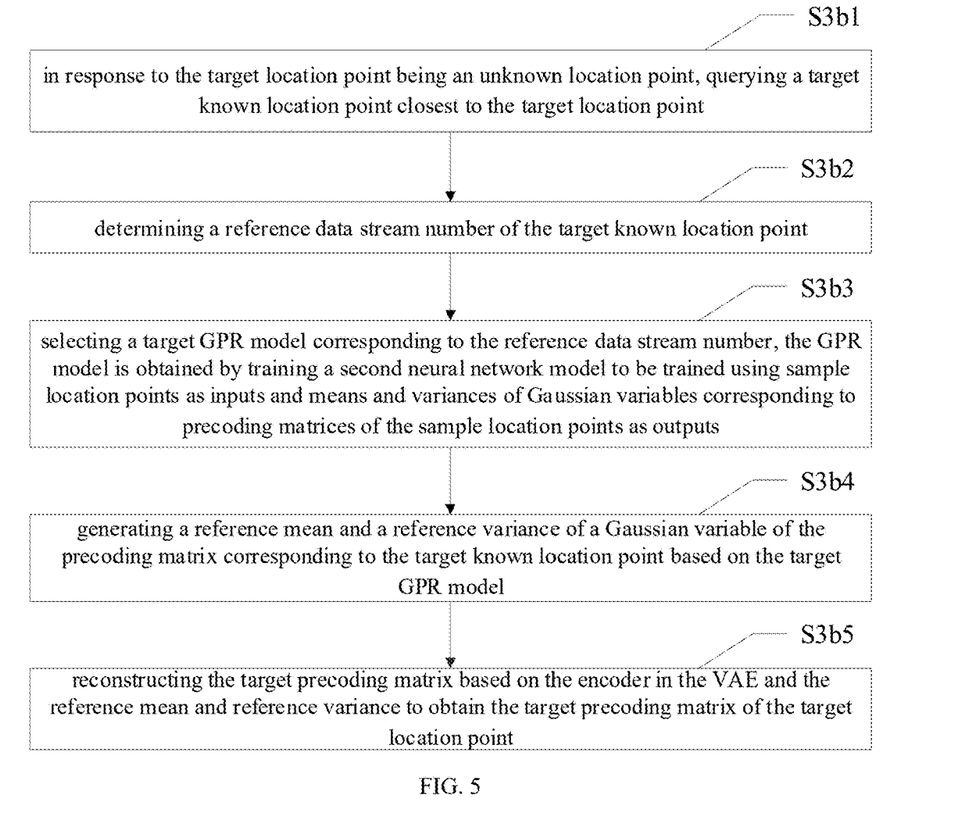
FIG. 5 is a flowchart of the method for selecting parameters of channel state information according to an embodiment of the present application.

As shown in FIG. 5, which is a flowchart of the method for selecting parameters of channel state information according to an embodiment of the present application.

Based on the above embodiment, in this embodiment, when the target location point is an unknown location point, the preset neural network model includes GPR model, and the step of determining a target precoding matrix of the target location point based on the target data stream number and a preset neural network model further includes:

step S3b1, in response to the target location point being an unknown location point, querying a target known location point closest to the target location point;

step S3b2, determining a reference data stream number of the target known location point;

step S3b3, selecting a target GPR model corresponding to the reference data stream number, the GPR model is obtained by training a second neural network model to be trained using sample location points as inputs and means and variances of Gaussian variables corresponding to precoding matrices of the sample location points as outputs;

step S3b4, generating a reference mean and a reference variance of a Gaussian variable of the precoding matrix corresponding to the target known location point based on the target GPR model; and step S3b5, reconstructing the target precoding matrix based on the encoder in the VAE and the reference mean and reference variance to obtain the target precoding matrix of the target location point.

It should be noted that since the reference stream numbers of the data stream at the target known location point is known, the corresponding target GPR can be selected according to the reference stream numbers, so as to generate the reference mean and reference variance of the Gaussian variable of the corresponding precoding matrix of the target known location point through the target GPR, and then the encoder in the VAE reconstructs the precoding matrix according to the reference mean and reference variance to obtain the target precoding matrix of the unknown target location point, that is, the target precoding matrix of any location point can be inferred by using GPR and VAE without the need for a feedback process.

Figure 6:
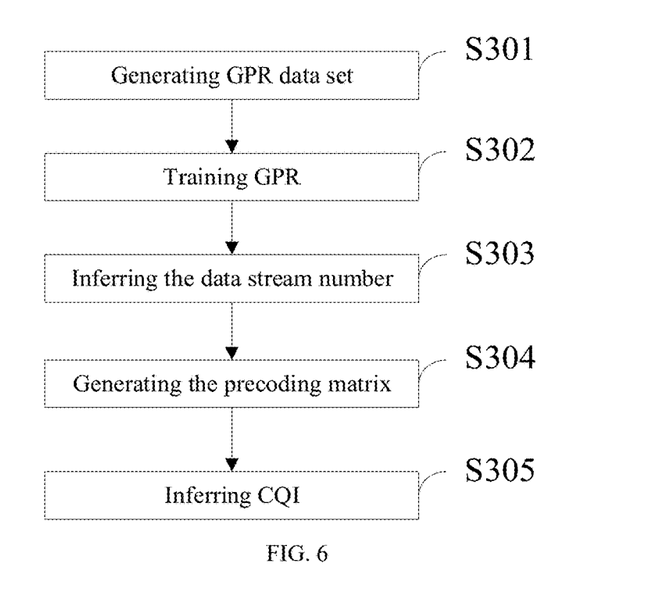
FIG. 6 is a schematic flowchart of a specific implementation of selecting parameters for unknown location points in the method for selecting parameters of channel state information of the present application.

In an embodiment, as shown in FIG. 6, step S304: for the precoding matrix of the unknown location point, according to the stream numbers obtained in step S303, selecting the GPR of the corresponding stream numbers, generating the mean and variance of the Gaussian variables in the latent space corresponding to the precoding matrix, and inputting them into the decoder of the VAE of the corresponding stream numbers to generate the precoding matrix. Step S305, for the CQI of the unknown location point, based on the CQI scatter value fixed at the known location point, using natural neighbor interpolation to infer the CQI value of the unknown location point.

It should be noted that the GPR needs to be created before step S3b3.

In an embodiment, as shown in FIG. 6, step S301: the stream number ranges from one to the maximum, and for the representative precoding matrix selected by VAE, the mean and variance of its latent space Gaussian variables are saved to obtain a data set of latent space Gaussian variables corresponding to the representative precoding matrix. Step S302, training GPR with the stream numbers ranging from one to the maximum. During training, the input of GPR is a known location point, and the output is the mean and variance of the representative precoding matrix in the VAE latent space at the corresponding location point. Setting the kernel function to a Gaussian function, and giving the corresponding input and output to the existing GPR fitter, so that the kernel function parameters can be automatically adjusted to fit the input-output relationship.

In an embodiment, the step of determining the target data stream number of the target location point based on the sampling data further includes:

Step S2b1: in response to the target location point being an unknown location point, determining the reference data stream number as the target data stream number of the target location point.

In an embodiment, as shown in FIG. 6, step S303: for an unknown location point, first determining its data stream number. By using the nearest neighbor interpolation method, the known point closest to the unknown point is found, and the fixed stream number of the known point is assigned to the unknown point.

Figure 7:
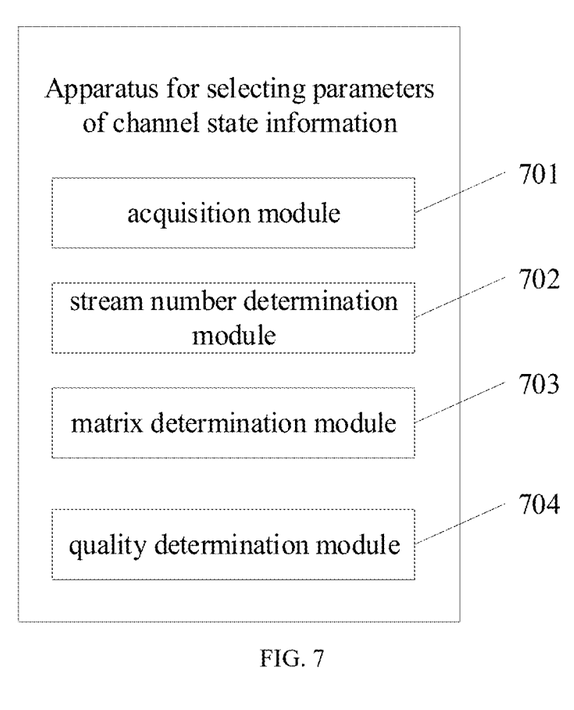
FIG. 7 is a schematic diagram of the structural configuration of a device for selecting parameters of channel state information according to an embodiment of the present application.

The present application further provides an apparatus for selecting parameters of channel state information. As shown in FIG. 7, the apparatus for selecting parameters of channel state information includes: an acquisition module 701, a stream number determination module 702, a matrix determination module 703, and a quality determination module 704.

The acquisition module 701 is configured to acquire sampling data at a target location point at different times, where the target location point is a location point of a parameter to be selected, and the location point that needs to be sampled among geographical location points within a base station coverage area.

The stream number determination module 702 is configured to determine a target data stream number of the target location point based on the sampling data.

The matrix determination module 703 is configured to determine a target precoding matrix of the target location point based on the target data stream number and a preset neural network model.

The quality determination module 704 is configured to determine a channel quality indicator of the target location point based on the target precoding matrix, where the data stream number, the precoding matrix, and the channel quality indicator are parameters of channel state information.

In an embodiment, the preset neural network model includes VAE.

The matrix determination module 703 is further configured to in response to the target location point being a known location point, determine an optimal precoding matrix set corresponding to the target data stream number; encode and reconstruct the optimal precoding matrix set based on the VAE to obtain the target precoding matrix of the target location point, where the VAE is obtained by training a first neural network model to be trained using the optimal precoding matrix set corresponding to each data stream number as input and the precoding matrix of the position point corresponding to each data stream number as output.

In an embodiment, the VAE includes an encoder and a decoder.

The matrix determination module 703 is further configured to perform dimensional transformation on each optimal precoding matrix in the optimal precoding matrix set based on the encoder to obtain a corresponding Gaussian variable; perform average operations on means and variances of all the Gaussian variables based on the VAE to determine an average mean and an average variance; query a target Gaussian variable with a smallest difference from the average mean and the average variance among the Gaussian variables; and reconstruct the precoding matrix based on the decoder and the mean and variance of the target Gaussian variable to obtain the target precoding matrix of the target location point.

In an embodiment, the quality determination module 704 is further configured to determine the target SINR of each data stream number based on the target precoding matrix; perform an average operation on the target SINRs to obtain an equivalent SINR value; and search a channel quality indicator corresponding to the equivalent SINR value based on a preset mapping table.

In an embodiment, the stream number determination module 702 is further configured to, in response to the target location point being a known location point, determine mutual information of a channel on each subcarrier of the target location point based on the sampling data; perform a summation operation on the mutual information of each subcarrier to obtain a total mutual information; determine data stream numbers at different times based on a maximum value of the total mutual information to obtain a data stream number set of the target location point; determine a mode of the data stream number set and whether the mode satisfies a preset proporti on; in response to the mode satisfying the preset proportion, determine the mode as the target data stream number of the target location point; or in response to the mode not satisfying the preset proportion, determine a value equal to the mode minus one as the target data stream number of the target location point.

In an embodiment, the preset neural network model includes a GPR model;

The matrix determination module 703 is further configured to in response to the target location point being an unknown location point, query a target known location point closest to the target location point; determine a reference data stream number of the target known location point; select a target GPR model corresponding to the reference data stream number, where the GPR model is obtained by training a second neural network model to be trained using sample location points as inputs and means and variances of Gaussian variables corresponding to precoding matrices of the sample location points as outputs; generate a reference mean and a reference variance of a Gaussian variable of the precoding matrix corresponding to the target known location point based on the target GPR model; and reconstruct the target precoding matrix based on the encoder in the VAE and the reference mean and reference variance to obtain the target precoding matrix of the target location point.

In an embodiment, the stream number determination module 702 is further configured to in response to the target location point being an unknown location point, determine the reference data stream number as the target data stream number of the target location point.

The specific implementation of the apparatus for selecting parameters of channel state information of the present application is basically the same as the various embodiments of the method for selecting parameter of channel state information described above, and will not be repeated here.

An embodiment of the present application provides a storage medium, and the storage medium stores one or more programs, and the one or more programs can also be executed by one or more processors to implement the steps of any of the above-mentioned method for selecting parameters of channel state information.

The specific implementation of the storage medium of the present application is basically the same as the embodiments of the method for selecting parameters of the channel state information described above, and will not be repeated here.

It should be noted that, in this article, the terms "include", "comprises" or any other variations thereof are intended to cover non-exclusive inclusion, so that a process, method, article or system including a series of elements includes not only those elements, but also other elements not explicitly listed, or further includes elements inherent to such process, method, article or system. In the absence of further restrictions, an element defined by the sentence "comprises a . . . " does not exclude the existence of other identical elements in the process, method, article or system including the element.

The serial numbers of the above-mentioned embodiments of the present application are for description only and do not represent the advantages or disadvantages of the embodiments.

Through the description of the above implementation methods, those skilled in the art can clearly understand that the above-mentioned embodiment methods can be implemented by means of software plus a necessary general hardware platform, and of course by hardware, but in many cases the former is a better implementation method. Based on such an understanding, the technical solution of the present application is essentially or the part that contributes to the prior art can be embodied in the form of a software product, which is stored in a storage medium (such as ROM/RAM, magnetic disk, optical disk) as described above, and includes a number of instructions for a terminal device (which can be a mobile terminal, a computer, a server, or a network device, etc.) to execute the methods described in each embodiment of the present application.

The above are only some embodiments of the present application, and do not limit the scope of the present application thereto. Under the inventive concept of the present application, equivalent structural transformations made based on the description and drawings of the present application, or direct/indirect application in other related technical fields are included in the scope of the present application.

What is claimed is:

1. A method for selecting parameters of channel state information, comprising:
    acquiring sampling data at a target location point at different times, wherein the target location point is a location point of a parameter to be selected, and the location point that needs to be sampled among geographical location points within a base station coverage area;
    determining a target data stream number of the target location point based on the sampling data;
    determining a target precoding matrix of the target location point based on the target data stream number and a preset neural network model; and
    determining a channel quality indicator of the target location point based on the target precoding matrix, wherein the data stream number, the precoding matrix, and the channel quality indicator are parameters of channel state information,
    wherein the preset neural network model includes a variational autoencoder (VAE), and the determining the target precoding matrix of the target location point based on the target data stream number and the preset neural network model comprises:
    in response to the target location point being a known location point, determining an optimal precoding matrix set corresponding to the target data stream number; and
    encoding and reconstructing the optimal precoding matrix set based on the VAE to obtain the target precoding matrix of the target location point, wherein the VAE is obtained by training a first neural network model to be trained using the optimal precoding matrix set corresponding to each data stream number as input and the precoding matrix of the position point corresponding to each data stream number as output.

2. The method for selecting parameters of channel state information according to claim 1, wherein the VAE comprises an encoder and a decoder, and the encoding and reconstructing the optimal precoding matrix set based on the VAE to obtain the target precoding matrix of the target location point comprises:
    performing dimensional transformation on each optimal precoding matrix in the optimal precoding matrix set based on the encoder to obtain a corresponding Gaussian variable;
    performing average operations on means and variances of all the Gaussian variables based on the VAE to determine an average mean and an average variance;
    querying a target Gaussian variable with a smallest difference from the average mean and the average variance among the Gaussian variables; and
    reconstructing the precoding matrix based on the decoder and the mean and variance of the target Gaussian variable to obtain the target precoding matrix of the target location point.

3. The method for selecting parameters of channel state information according to claim 1, wherein the determining the channel quality indicator of the target location point based on the target precoding matrix comprises:
    determining a target signal-to-interference-plus-noise ratio (SINR) of each data stream number based on the target precoding matrix;

performing an average operation on the target SINRs to obtain an equivalent SINR value; and searching a channel quality indicator corresponding to the equivalent SINR value based on a preset mapping table.

4. The method for selecting parameters of channel state information according to claim 1, wherein the determining the target data stream number of the target location point based on the sampling data comprises:

in response to the target location point being a known location point, determining mutual information of a channel on each subcarrier of the target location point based on the sampling data;

performing a summation operation on the mutual information of each subcarrier to obtain a total mutual information;

determining data stream numbers at different times based on a maximum value of the total mutual information to obtain a data stream number set of the target location point;

determining a mode of the data stream number set and whether the mode satisfies a preset proportion;

in response to the mode satisfying the preset proportion, determining the mode as the target data stream number of the target location point; or in response to the mode not satisfying the preset proportion, determining a value equal to the mode minus one as the target data stream number of the target location point.

5. The method for selecting parameters of channel state information according to claim 1, wherein the preset neural network model comprises a Gaussian Process Regression (GPR) model, and the determining a target precoding matrix of the target location point based on the target data stream number and a preset neural network model further comprises:

in response to the target location point being an unknown location point, querying a target known location point closest to the target location point;

determining a reference data stream number of the target known location point;

selecting a target GPR model corresponding to the reference data stream number, wherein the GPR model is obtained by training a second neural network model to be trained using sample location points as inputs and means and variances of Gaussian variables corresponding to precoding matrices of the sample location points as outputs;

generating a reference mean and a reference variance of a Gaussian variable of the precoding matrix corresponding to the target known location point based on the target GPR model; and reconstructing the target precoding matrix based on the encoder in the VAE and the reference mean and reference variance to obtain the target precoding matrix of the target location point.

6. The method for selecting parameters of channel state information according to claim 5, wherein the determining the target data stream number of the target location point based on the sampling data further comprises:

in response to the target location point being an unknown location point, determining the reference data stream number as the target data stream number of the target location point.

* * * * *